Dec. 30, 1941. C. H. GRIFFITH 2,267,824
AIR INTAKE DEVICE FOR PASSENGER VEHICLES
Original Filed Oct. 21, 1938
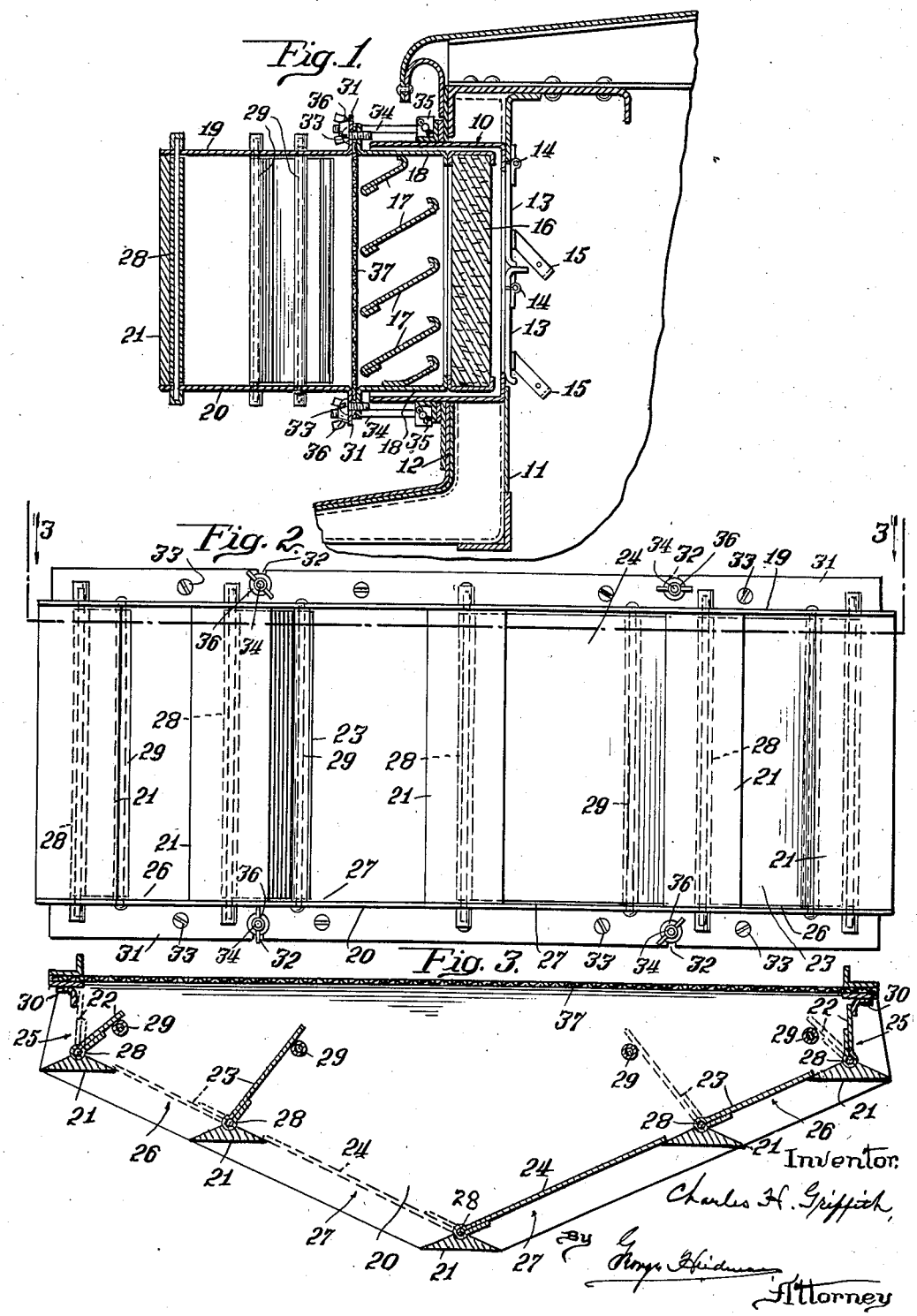
Inventor
Charles H. Griffith
By
Attorney Patented Dec. 30, 1941

2,267,824

UNITED STATES PATENT OFFICE 2,267,824

AIR INTAKE DEVICE FOR PASSENGER VEHICLES

Charles H. Griffith, Parsons, Kans.

Original application October 21, 1938, Serial No. 236,705, now Patent No. 2,209,817, dated July 30, 1940. Divided and this application March 27, 1940, Serial No. 326,193

4 Claims. (Cl. 98—13)

My invention relates to a device for introducing air into a passenger vehicle, being more especially intended for railway passenger cars and particularly adapted for use with the air conditioning systems of railway passenger cars.

The invention pertains to a device which is automatically operable by the outer air currents and has for its object the provision of a device with comparatively large intake openings which at all times will permit inflow of air to the car interior regardless of whether the car is or is not in motion.

A further object of the invention is the provision of a device which is readily adaptable to existing outside air intakes located on the exterior of the vehicle; the device being applicable for use with present day ventilating and air conditioning equipment employed in railroad passenger cars.

The objects and advantages of my invention will all be readily comprehended from the detailed description of the exemplification disclosed in the accompanying drawing, wherein—

Figure 1 is a transverse sectional view of the upper or deck portion of a railroad passenger car provided with an air intake to which my device is shown applied; the device being shown in vertical section.

Figure 2 is an outside elevation of my improved device.

Figure 3 is a sectional view taken substantially on the line 3—3 of Figure 2 looking in the direction of the arrows.

My invention is intended for introducing outside air into a vehicle being especially adapted for railroad passenger cars as illustrated in the drawing where it is shown applied to an air intake located in the upper part or side deck portion of a railroad passenger car of which a portion is shown in section. The drawing discloses a well known construction of air intake consisting of a suitable housing 10 connected with the inner wall 11 of a railroad car and extending through the outer wall 12. The interior of the car is usually provided with suitable dampers as at 13, 13 which are pivotally connected at 14 and manually controlled from the car interior by suitable mechanism, of which a portion is shown at 15. The housing 10 is shown provided with a suitable filtering mechanism at 16 and with a plurality of louvers 17 which are generally stationarily mounted and intended for the elimination of water from the incoming air currents; the filter mechanism and the louvers being shown as preferably mounted in a separate casing 18 inserted in the housing 10.

The device, which may be of sheet metal or a suitable composition, comprises a housing having an opening in its rear side matching the outer end of the casing 18 and consisting of a top wall 19 and a bottom 20, the perimeters whereof each define a five sided figure, with two sides sloping outwardly toward the transverse median line of the housing and hence away from the car wall. The top and bottom walls are spaced apart and supported at their outer perimeters by a plurality of vertically disposed members 21, which are preferably triangular in cross section, see Figure 3, with their sloping sides disposed toward the interior of the housing to provide air directing surfaces and also provide stops for the free ends of the shutters; the members 21 being arranged to provide six air admitting openings with three openings on each side of the transverse median line of the housing. The exemplification shows the device provided with five shutters 22, 22, 23, 23 and 24 so arranged that the free ends of the shutters will overlap one of the sloping sides of the members 21, except the shutters 22, 22 at opposite ends of the housing. The shutters 22, 22 are of equal size and are adapted to close the openings 25, 25 at the ends of the housing disposed in the direction of movement of the car. The shutters 23, 23 also shown of equal size, somewhat larger than shutters 22, are adapted to close the openings 26, 26; while the large shutter 24 is adapted to control the two openings 27 on opposite sides of the member 21 arranged substantially at the transverse center line of the device. All of the shutters are pivoted at one of their sides, as at 28, to swing through horizontally disposed arcs. The extreme open positions of shutters 22, 22 and 23, 23 are controlled by suitable pins or stops 29, which may be in the nature of rods extending from top to bottom of the housing. These stops or rods are so arranged, relative to the free ends of their respective shutters, as not to interfere with the free movement of the adjacent shutters and also to so position the respective shutters, when open, that the inrushing air will be deflected directly toward the intake opening in the side of the car.

The vertically disposed members 21, on opposite sides of the central or intermediate member 21, are arranged so that one of the sloping sides or surfaces will be disposed substantially parallel with the shutters, when the latter move to closed position, to permit the latter to overlap said sides and prevent further outward swinging movement of the shutters. The housing adjacent the end openings 25 is provided with suitable angle bars 30 which constitute stops for the end shutters 22.

The top and bottom walls at the rear of the device are shown provided with vertically disposed flanges 31 which substantially correspond with the flanged outer end of casing 18. The flanges 31 are provided with holes or slots as at 32 arranged to register with similar holes and slots in the flanges of casing 18; the holes being adapted to receive suitable screws or bolts 33 for fastening the housing to the casing 18, while the slots are intended to receive the threaded ends of the links or bolts 34, whose inner ends are pivotally secured to the brackets 35 on the housing 10; the threaded ends of the links 34 being shown with butterfly nuts 36 whereby the air intake device and louver containing casing 18 are removably secured at the outer end of the housing 10. I prefer to provide a screen 37 which is shown clamped between the opposing flanges of casing 18 and the air intake housing.

With this construction, if the car is moving to the left, the air or wind pressure will cause the shutters 22 and 23 at the left hand end of the device to move to their complete open position against the stops 29, as shown in full lines in Figure 3; while the shutter 24 will be swung entirely to the right into overlapping relation with the member 21 at the right of the transverse center line of the device as shown in full lines. During such inrush of air from the left, shutters 23 and 22 at the right hand end of the device will swing into complete closed position as shown in full lines. When the car moves in the opposite direction, the positions of the shutters will be reversed and shutters 22 and 23 at the left will swing to their closed positions shown in dotted lines in Figure 3, while the centrally mounted shutter 24 will swing to the dotted line position shown to the left of the intermediate upright member 21; the closed shutters forcing the trapped air through the screen and filter means into the car interior when the dampers 13 are opened.

It will be readily understood that my improved air intake device may be located at any suitable point on the car or vehicle and lengthwisely thereof so that three intake openings will always be disposed in the general direction of travel; the intake openings having air directing surfaces and are controlled by self adjusting shutters which will cause the entrapped air to flow into the car without permitting an eduction or exhausting action to be created as, however, is the case with existing types of air intake housings during certain vehicle or car speeds, resulting from the slip stream action of the air across the face of the inlet of the housing.

I have disclosed my invention as applied to the air intake arranged in the upper part of a railroad passenger car, but it will be understood that the point of application, with or without air filtering and conditioning means, may be altered without, however, departing from the spirit of my invention.

This application is a division of my copending application Serial Number 236,705, now Patent No. 2,209,817, dated July 30, 1940, being for matter deleted from said application S. N. 236,705, namely the structure shown in Figures 7, 8 and 9 thereof; and while the exemplification is believed to be the best embodiment of the invention, modifications are possible and may be made without, however, departing from the spirit of the invention as defined in the appended claims.

What I claim is:

1. An air intake device comprising an elongated housing having outwardly sloping sides converging substantially at the transverse median line of the housing and a straight rear open side adapted to be secured to the exterior of a passenger car, while the outer sloping sides of the housing are provided with corresponding air inlet openings arranged on opposite sides of the transverse median line of the housing; closure members pivotally mounted adjacent the inlet openings so as to swing horizontally inward by the external air pressure one of said closure members being pivotally secured at the transverse median line of the device so as to swing across the openings at opposite sides of the median line; and means for limiting the swinging movement of certain of the closure members and to position the latter so that the closure members on one side of said median line will move to closed position by the air admitted through the inlet openings on the opposite side of said median line and the entrapped air caused to flow through the outlet in the rear wall of the housing.

2. An air intake device of the character described comprising a housing provided with a straight rear wall and with outwardly and opposingly sloping side walls intersecting substantially at the transverse median line of the housing, the rear wall having an outlet opening adapted to be in communication with a car interior, while the opposingly sloping side walls are each provided with a plurality of air inlet openings; deflecting surfaces arranged adjacent said openings; closure members pivoted adjacent the deflecting surfaces to swing horizontally inwardly; one of the closure members being pivoted at the transverse median line of the housing and free to swing to either side thereof so as to alternately control an opening at each side of the median line; and stop means arranged in the paths of the free ends of the other closure members whereby said closure members on one side of the median line will be positioned to deflect the inrushing air toward said outlet opening and said closure members on the other side of the median line will be held in the path of the inrushing air and thereby forced to closed position and the trapped air made to pass into the outlet opening in the rear wall.

3. An air intake device of the character described comprising a housing adapted to be removably secured to the exterior of a passenger car and provided with a rear attaching wall, two end walls and two outwardly sloping sides converging toward the transverse median line of the housing, the rear wall having an outlet opening adapted to be in communication with the car interior while the sloping side walls and end walls are provided with air inlet openings; deflecting surfaces arranged adjacent said inlet openings; closure members pivoted adjacent the respective deflecting surfaces to swing horizontally inwardly through the action of exterior air pressures; one of the closure members being pivoted at the transverse median line of the housing so as to swing to either side thereof and control an opening on each side of the median line; and stop means arranged in the paths of the other closure members whereby the free ends of said closure members disposed in the direction of movement of the car will be positioned to deflect the air toward said outlet opening and the closure members on the opposite side of said median line will be held in the path of the inrushing air and forced to closed position and the trapped air made to flow through the outlet opening and into the car.

4. An air intake device of the character described comprising a housing composed of corresponding top and a bottom walls having straight rear edges provided with vertical flanges, said walls being of substantially pentagonal configuration, a plurality of vertically disposed members secured adjacent the perimeters of said walls in prearranged spaced relation whereby said walls are secured together in spaced relation and an open sided housing provided, with the straight rear open side adapted to be in communication with the car interior and the oppositely sloping sides disposed horizontally outward and converging substantially at the transverse median line of the housing; horizontally swinging closure members each secured at one end to one of said vertically disposed members so as to swing inwardly and the free end adapted to overlap the adjacent vertical member when in closed position; and means for limiting the extent of inward movement of the closure members, whereby the closure members on one side of the transverse median line of the device will automatically close when the closure members on the other side of said median line and disposed in the direction of vehicle movement are open and the entrapped air caused to flow through the rear side of the device.

CHARLES H. GRIFFITH.